United States Patent [19]

Winlker et al.

[11] Patent Number: 4,879,802
[45] Date of Patent: Nov. 14, 1989

[54] GRIPPER FOR TOOLS OF A MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 192,188

[22] Filed: May 10, 1988

[30] Foreign Application Priority Data

May 22, 1987 [DE] Fed. Rep. of Germany ....... 3717201

[51] Int. Cl.$^4$ ............................................. B23Q 3/157
[52] U.S. Cl. ....................... 29/568; 294/94; 294/110.2; 294/116; 414/739
[58] Field of Search .................. 29/568; 294/94, 110.2, 294/116; 414/739, 740, 744 A

[56] References Cited

U.S. PATENT DOCUMENTS

| 4,126,233 | 11/1978 | Jeske | 29/568 X |
| 4,274,192 | 6/1981 | Norimatsu | 29/568 |
| 4,557,035 | 12/1985 | Rütschle et al. | 29/568 |
| 4,642,875 | 2/1987 | Rütschle et al. | 29/568 |

FOREIGN PATENT DOCUMENTS

| 2410444 | 3/1974 | Fed. Rep. of Germany . |
| 2812200 | 3/1978 | Fed. Rep. of Germany . |
| 3016026 | 4/1980 | Fed. Rep. of Germany . |
| 3320874 | 6/1983 | Fed. Rep. of Germany . |
| 237809 | 5/1985 | German Democratic Rep. . |
| 144944 | 11/1980 | Japan ..................... 29/568 |

*Primary Examiner*—Steven C. Bishop
*Attorney, Agent, or Firm*—Pretty, Schroeder, Brueggemann & Clark

[57] ABSTRACT

A gripper for tools of a machine tool is provided with a hand with at least one moveable jaw arranged thereon for form-locking engagement of the tools.

In order to enable the tools to be automatically gripped in form-locking engagement, without any supply of auxiliary energy, the hand is provided with an actuating element that can be moved by means of a stationary stop provided on the machine tool to move the jaw into a spread-apart position for introducing the tool, and into a closed position for gripping the tool in a form-locking manner.

4 Claims, 2 Drawing Sheets

GRIPPER FOR TOOLS OF A MACHINE TOOL

The present invention relates to a gripper for tools of a machine tool comprising a hand with at least one movable jaw arranged thereon for form-locking engagement of the tools.

A gripper of this type has been known already from DE-OS No. 33 20 874.

It has been known in connection with modern machine tools, in particular in connection with so-called machining centers where a plurality of processing operations is to be carried out on a plurality of workpieces in program-controlled sequence, to present tools in a magazine near the spindle stock, to remove the previously used tool by means of a gripper and change a new tool from the magazine into the spindle for the next processing operation, between two processing operations. It has been known to this end to use grippers having a movable arm and a hand arranged on the free end of the arm. Now, a tool can be transferred between the magazine and the spindle by corresponding movement of the gripper.

In the case of a first type of machine tools, as known for example from U.S. Pat. No. 4,642,875, the tools are arranged in a magazine provided with suitable transport means, and the spindle is provided with only two grippers for removing a used tool from the spindle and picking up the next tool from the magazine and inserting it in the spindle, the two grippers moving in opposite senses. In order carry out the tool change in this case, the magazine must be operated by the before-mentioned transport means in such a manner that an empty position is available at the stationary transfer station for each tool to be exchanged, while on the other hand the next tool to be used is to be presented at a likewise stationary transfer station for being picked up by the gripper. It is an essential feature of this type of machine tools that each gripper handles one by one all tools required for the whole working cycle of the workpiece. The hands of the grippers of these known machine tools, therefore, are provided with a U-shaped receiving opening so that the tools can be gripped and removed, and thereafter be transferred to the spindle, by a radial movement (relative to the tool axis). The tools are not fixed in the hand against rotation so that the hand may remain in its position on the tools even during the working process in order to minimize the necessary re-tooling times.

It has been found, however, that the tool may get dislodged in the hand of the gripper due to motive forces, in particular in the case of very short re-tooling times and, consequently, very quick movements of the gripper. This is of particular disadvantage when the tool is to be introduced into the spindle in a specific circumferential position, in particular when a sliding block on the spindle is to engage a matching groove in the periphery of the tool.

In the case of another group of machine tools, as described for example by U.S. Pat. No. 4,557,035, a plurality of grippers is arranged about the spindle, with each gripper being firmly associated with one tool. For changing a tool, the gripper which is still holding the used tool removes the used tool from the spindle, while the gripper associated with the new tool inserts the latter into the spindle in an oppositely directed movement. In contrast with the type of machine tools described before, one and the same gripper remains in contact with one and the same tool throughout the whole machining cycle in the case of this type of machine tools.

While in the case of the type of machine tools described first, the user initially has to fill the magazine with the required number and kind of tools which are thereafter picked up by the grippers as required during the machining cycle, it is characteristic of the type of machine tools described last that the tools are inserted by the user into the hands of the existing plurality of grippers.

Now, it has been known from the before-mentioned DE-OS No. 33 20 874 in connection with the type of machine tools described last to provide the hands of the grippers with form-locking fixing means for the tools. In this case, one movable jaw is opened during the magazine-filling process by manual operation of a push-button, and then closed again after the tools have been inserted. The tools, therefore, are safely held in the hands of the grippers and are prevented from changing their position unwantedly, and this even during the rapid movement of the grippers normally required in view of the short re-tooling times desired today. Nevertheless, the tools are retained rotatably in the hand of the gripper so that the hand may remain in contact with the tool during the working operation. This concept of fixing the tools by form-locking means is, however, possible only for this type of machine tools because here—as has been mentioned before—the hand of the grippers, including the form-locking fixing means, is from the very beginning intended to remain connected with the tool during the whole working cycle.

Now, it it the object of the present invention to improve a gripper of the type described above so that it can be used also for machine tools using only one or two grippers for changing the tools and for handling successively all tools provided in a magazine with transport means for the tools.

This object is achieved according to the invention by an arrangement which is characterized in that the hand is provided with an actuating element that can be moved by means of a stationary stop provided on the machine tool to move the jaw into a spread-apart position for introducing the tool, and into a closed position for gripping the tool in a form-locking manner.

This solves the object underlying the present invention fully and completely because it is thus possible, merely by moving the arm in a selective manner, to move the hand with the movable actuating element into contact with the stationary stop on the machine tool so that the movable jaw or the movable jaws will open and enable a tool to be introduced or to be removed. It is not necessary for this purpose to provide a separate energy supply, for example in the form of electric current, compressed air or oil. The only thing that might be necessary is a slight extension of the kinematics of the gripper. The tool which is now retained in a form-locking manner can now be handled by means of a gripper even at high speeds without any risk that the tool might get dislodged radially from the hand of the gripper.

According to a preferred embodiment of the invention, the actuating element acts against the force of a spring.

This feature provides the advantage that the actuating element has to be deflected only in one direction while its deflection in the other direction is ensured by the restoring force of the spring. This may simplify considerably the required additional kinematics of the gripper.

According to a preferred variant of this embodiment of the invention, the movable jaw occupies its closed position in the relaxed condition of the spring.

This feature provides the advantage that the tool is constantly held in form-locking engagement due to the action of the spring.

According to a particularly preferred embodiment of the invention, the actuating element is designed as an axially displaceable bolt, the jaw can be pivoted about an axis and is provided with at least one cam for such pivoting motion, and the bolt has two elements of different radial extension which bear against the cam alternately in two different axial positions.

These features provide the advantage that the axial displacement of a bolt, which can be released very easily by axial abutment of the hand of the gripper against the stationary stop, can be translated in a simple manner into an opening movement of one or two jaws.

According to a preferred improvement of this embodiment, the bolt is provided with at least one axial inclined guiding surface which extends at a angle relative to the bolt axis and which serves as a guide for a ball resting on the other hand against the cam.

This feature provides on the one hand the particular advantage that the movement is transmitted via an inclined surface which permits suitable power transmission so that a considerable actuating force can be provided for the jaws or an important angular movement of the jaws can be achieved, even if the bolt is moved only a small way in the axial direction, depending on the constructional possibilities and intended effects and on the circumstances of the particular case. In addition, having the power transmitted by the balls provides the considerable advantage that little friction is encountered so that the actuating force can be kept small and safe closing is ensured even with a relatively small restoring spring, without any risk of the driving elements getting blocked.

According to one particularly preferred embodiment of the invention, where two movable jaws are provided each of which is equipped with two cams for pivoting the jaws into the two positions, the bolt acts against the force of a spring and is provided with a plurality of inclined guiding surfaces which are distributed over its periphery in oppositely directed pairs, with one inclined surface of each pair bearing alternately upon the cams of the jaws through the intermediary of balls.

This feature provides the advantage that the opening and closing movement of the jaws is guided via a total of four balls acting in pairs in opposite senses so that the kinematics of the movements can be adjusted in a very simple manner via the inclined guiding surfaces and forced control of the opening and closing movements is guaranteed.

According to another preferred variant of the invention, the axes of the tools, the jaws and the bolts extend in parallel.

This provides a particularly simple and twist-free arrangement, it being an additional advantage that the actuating means for the bolt is arranged in the axial direction of the tools. Usual machine tools of the type under discussion are normally anyway provided with the possibility to move the hand of the gripper in the direction of the tool axis, due to the sequence of movements of the grippers, because in the case of the known machine tools the tool is first lifted in the axial direction and then withdrawn from the magazine. Therefore, it is only necessary in this case to change a little the axial travel of the hand; in most cases it should even suffice to provide the stationary stop in the magazine, the axial lifting movement of the hand which is anyway required being sufficient to provoke the opening and/or closing movement of the jaws by axial movement of the bolt.

According to another preferred embodiment of the invention, the cam or cams are adjustable in the axial direction.

This provides the particular advantage with respect to the cams that it permits exact adjustment of the closing position in which the contact between the jaws and the tool is such as to enable the tool to rotate inside the jaws practically free from friction, while on the other hand there is almost no risk of their getting dislodged relative to a desired position.

Finally, another embodiment of the invention is preferred where the movable jaw moves on a stationary jaw, the stationary jaw being provided with a straight guide whose inner clear width corresponds to the circumference of the tool, and the movable jaw being provided, at least by portions, with retaining means for the tools in the form of a circular arc, which retaining means are located outside the inner clear width in the spread-apart position.

This feature provides the advantage that the hand of the gripper can initially grip the tool in the axial direction, while the movable jaws are still outside the path of movement of the tool. Only when the tool has been received, for example, in a semi-circular receiving opening of the fixed jaws, at the end of the straight guide, will the movable jaws close so as to hold the tool in form-locking engagement over its full circumference or at least over a large part thereof.

Other advantages of the invention will become apparent from the following specification and the attached drawing.

It is understood that the features that have been described above and will be explained hereafter, can be used in any embodiment of the invention not only in the described combinations, but also in any other combination or individually, without leaving the scope of the present invention.

One embodiment of the invention will be described hereafter in greater detail with reference to the drawing in which.

Figure 1:
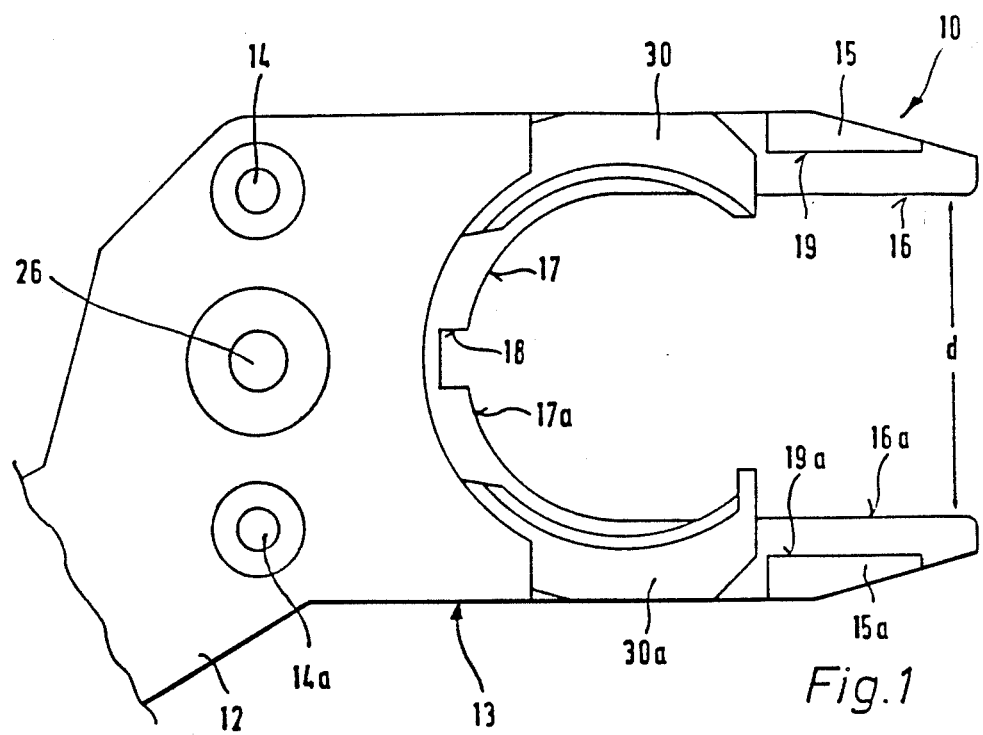
FIG. 1 shows a top view of a hand of a gripper according to the invention, in the closed position.
Figure 2:
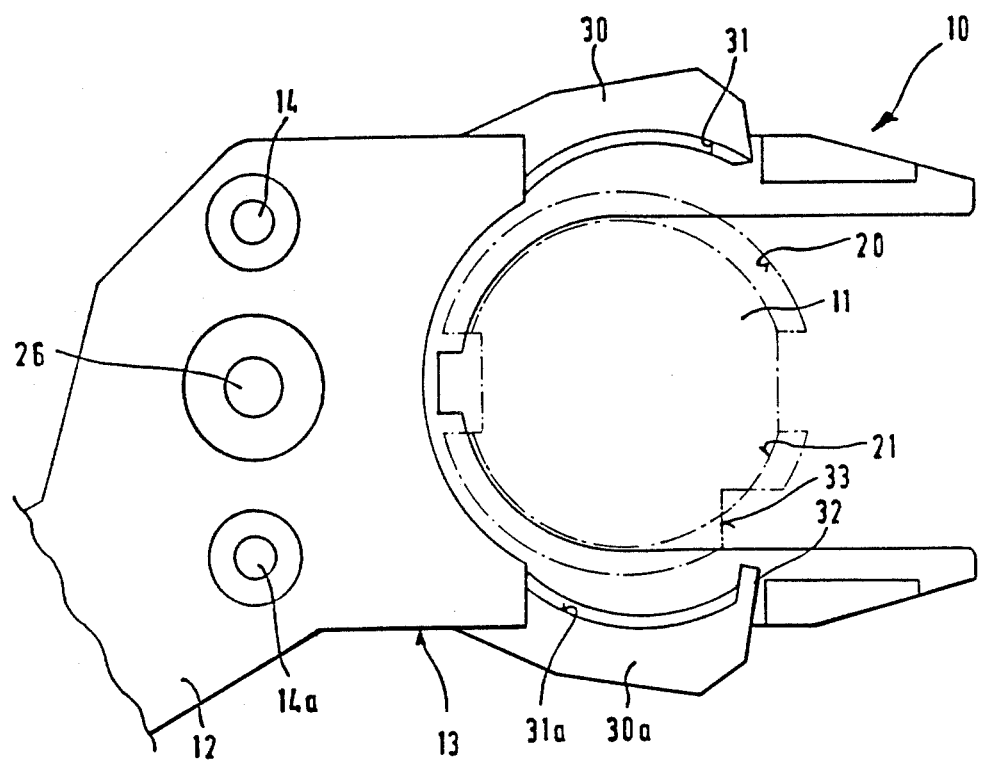
FIG. 2 shows a representation similar to that of FIG. 1, but in the spread-apart position.

Regarding FIGS. 1 and 2, reference numeral 10 indicates generally a gripper provided for gripping and holding a tool 11 indicated diagrammatically in FIG. 2. An arm 12 of the gripper 10 is indicated in FIGS. 1 and 2 and extends, generally, away from the drawing plane of FIGS. 1 and 2, initially in an inclined direction and then vertically, while a hand 13 of the gripper 10 usually extends in a horizontal plane. Reference numerals 14, 14a designate centering means which may be provided on top with bevelled bores coacting with associated centering pins provided on the spindle or on the magazine of the machine tool. However, reference numerals 14, 14a also designate pivot axes, as will be explained in greater detail further below, in connection with FIG. 3.

Reference numerals 15, 15a designate two fixed jaws of the hand 13 which are, however, open to the front and comprise straight, parallel guides 16, 16a defining between them an interior width d. Near the arm 12, the straight guides 16, 16a end in a semi-circular receiving opening 17 comprising a centering groove 18. The forward free ends of the fixed jaws 15, 15a are provided with limiting legs 19, 19a which serve as lateral guides for the tool 11.

The inner width d, or the distance between the limiting legs 19, 19a, is selected in such a manner that the tool 11, with outer diameters 20 or 21, is guided axially in form-locking engagement between the fixed jaws 15, 15a. The tool 11 exhibits for this purpose an axial profile of a type which is known in the art and which, accordingly, need not be described here in detail.

Between the centering means and/or the axes 14, 14a, one can see an actuating button 26 whose function will be explained further below, in connection with FIGS. 3 and 4. The actuating button 26 can be moved in a direction vertical to the drawing plane of FIGS. 1 and 2. If the actuating button 26 is moved in this manner, it causes movable jaws 30, 30a to rotate about the axes 14, 14a, from the closed position shown in FIG. 1 into the spread-apart position shown in FIG. 2. The movable jaws 30, 30a are provided with semi-circular retaining means 31, 31a adapted to the known outer contour of the tool 11. For fixing the tool 11 in a specific angular position, one free end of the movable jaw 30a is provided with a projection 32 engaging a matching corner-shaped recess 33 in the tool 11.

From the above it appears clearly that in the spread-apart position shown in FIG. 2 the tool 11 can be introduced into the hand 13 from the right side until it comes to rest against the semi-circular receiving opening 17 of the hand 13. If, thereafter, the movable jaws 30, 30a are moved into the closed position shown in FIG. 1, the tool 11 is secured in its position, both in the drawing plane of FIGS. 1 and 2, and against rotation about its vertical axis.

In this position, the tool 11 can be transferred into the spindle of a machine tool, even at very high speeds, without any risk of undesirable changes in the position of the tool 11. Quite to the contrary, the tool 11 is presented to the spindle of the machine tool also in a defined circumferential position so that the sliding block of the spindle, if any, can directly engage the corresponding groove in the tool 11.

The operation of the actuating button 26, in conjunction with the movable jaws 30, 30a will now be described with reference to FIGS. 3 and 4.

It is apparent from the figures that the actuating button 26 takes the form of a bolt 40 provided with an axial first blind bore 41 accommodating a helical spring 43. A second, concentrical but oppositely directed blind bore 43 guiding the bolt 40 in the axial direction is provided in the hand 13. The helical spring 42 bears by its one end against a first bottom 44 of the bolt 40 and, by its other end, against a second bottom 45 of the second blind bore 43.

Figure 4:
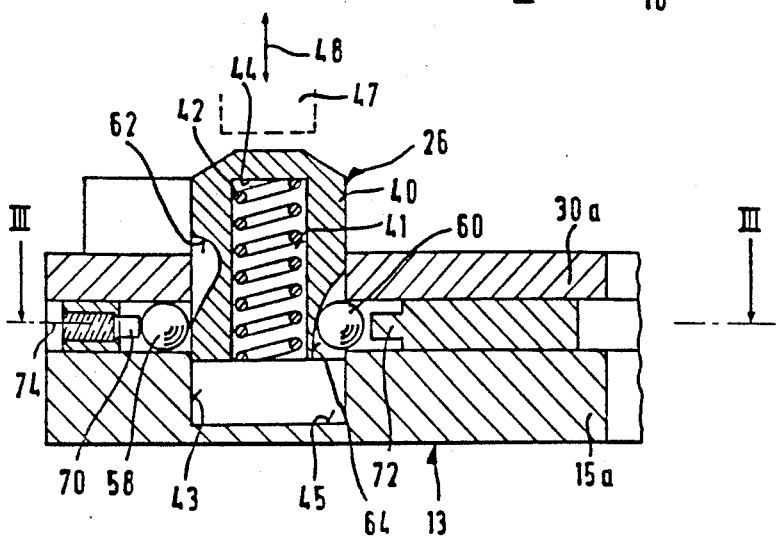
FIG. 4 shows a side view of the hand shown in FIG. 3, cut along line IV—IV in FIG. 3, with certain parts broken away.

Above the bolt 40, one can see in FIG. 4 a stationary stop indicated by reference numeral 47. One will easily realize that when the hand 13 moves in the direction indicated by double arrow 48, the bolt 40 gets into contact with the stationary stop 47 and is urged downwardly, against the action of the helical spring 42, into the second blind bore 43.

Figure 3:
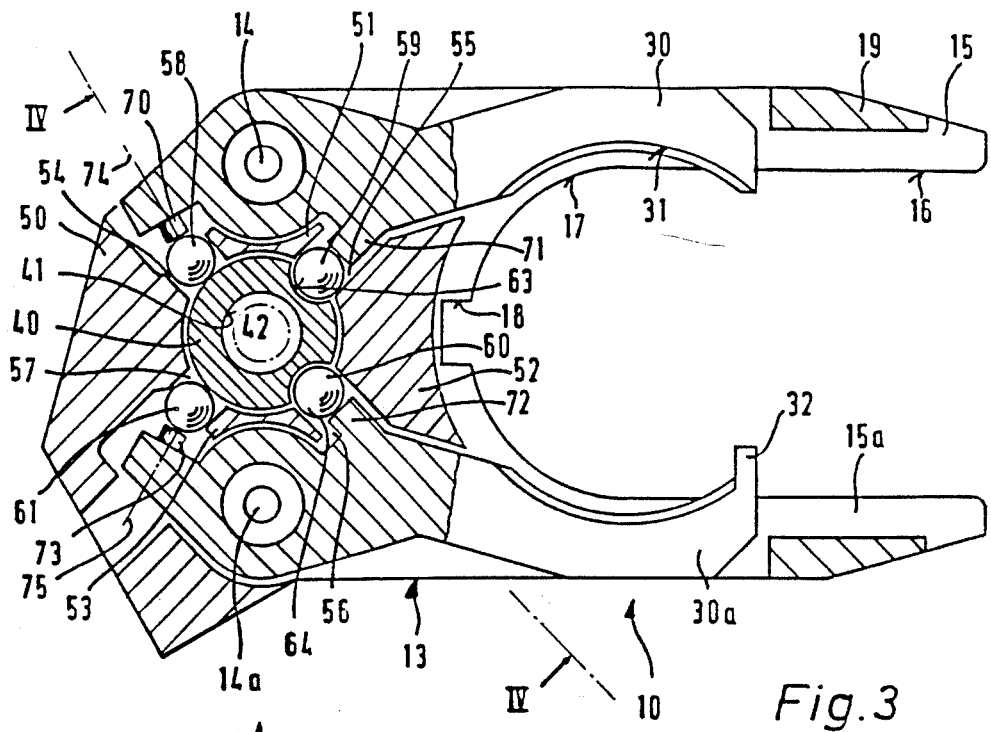
FIG. 3 shows a partially cut representation of the arrangement, as viewed in FIG. 1, in plane III—III according to FIG. 4.

From FIG. 3 it appears very clearly that the second blind bore 43 does not guide the bolt 40 around its full circumference. Rather, the second blind bore 43 is constituted by four circumferential portions 50, 51, 52, 53 of the hand 13 arranged at a certain circumferential spacing relative to each other. As a result of this arrangement, radially extending channels 54, 55, 56, 57 are formed between the circumferential portions 50, 51, 52, 53. The radially extending channels 54, 55, 56, 57 end at the outer periphery of the bolt 40 and serve as races for balls 58, 59, 60, 61.

As can be seen clearly in FIG. 4, and partly also in FIG. 3, the bolt 40 is provided at its outer periphery, in the area of the channels 54, 55, 56, 57, with inclined guiding surfaces or grooves, of which three, namely the inclined guiding surfaces 62, 63, 64, can be seen in FIGS. 3 and 4, while the inclined guiding surface coacting with the ball 61 cannot be seen in the drawing.

The arrangement of the inclined guiding surfaces 62, 63, 64 is such that in each of the two axial end positions of the bolt 40 two balls are moved into and two other balls are moved out of contact with the inclined guiding surfaces so that the latter balls come to rest against the outer circumference of the bolt 40. This radial movement of the balls 58, 59, 60, 61 provoked when the bolt 40 is moved in axial direction is utilized to move the movable jaws 30, 30a to and fro between the end positions shown in FIGS. 1 and 3.

As can be seen best in FIG. 3, the movable jaws 30, 30a which can rotate about the axes 14, 14a are provided for this purpose with cams 70, 71, 72, 73, the cams 70 and 73, which when actuated in the axial direction cause the two jaws 30, 30a to move into the closed position, being axially adjustable. This fact is indicated in FIG. 3 by the axes 74, 75, and in FIG. 4 it can be seen that the cams 70 and 73 may take the form of grub screws, for example.

In the closed position shown in FIG. 3, the bolt 40 is in its uppermost end position, and the helical spring 42 is relaxed. The balls 59 and 60 have entered the associated inclined guide portions 63, 64 so that the opening cams 71, 72 are not engaged. The balls 58, 61 have left the inclined guide portions, due to the oppositely directed design of the inclined guide portion 62 and the other, not visible inclined guide portion of the ball 61, and rest against the outer circumference of the bolts 40. As a result of this radial movement of the balls 58, 61, the closing cams 70, 73 are actuated and the movable jaws 30, 30a are moved into the closed position illustrated in FIGS. 1 and 3.

When the hand 13 is now moved upwardly in the direction of the double arrow 48 in FIG. 4, against the stationary stop 47, the bolt 40 is pushed downwardly into the second blind bore 43 and against the stop, against the action of the helical spring 42. The balls 59 and 60 are thereby caused to run upwardly along their inclined guide surfaces 63, 64 and radially outwardly so that the opening cams 71, 72 are actuated and the movable jaws 30, 30a are opened to assume the spread-apart position illustrated in FIG. 1. At the same time, the balls 58, 61 can enter the oppositely directed inclined guide portions 62 and the inclined guide portion of the ball 61 not shown in the drawing, whereby the closing cams 70, 73 are released.

From the above it appears that this arrangement provides forced control of the opening and closing movements so that controlled movements of the movable jaws 30, 30a are ensured in both case of the movement.

It is understood, however, that two balls may be used instead of the four balls described, for example when the moving elements provoking the closing movements (balls 58, 61, inclined guide portion 62, closing cams 70, 73) are replaced by corresponding springs.

Also, the axes 14, 14a need not necessarily extend in parallel to the axes of the bolt 40 and of the tool 11; rather, it is also possible to use inclined arrangements or arrangements set off by 90°, as long as the described sequence of controlled opening and closing movements is safely realized by mere abutment against a stationary stop.

We claim:

1. A machine tool comprising:
   (a) a working spindle;
   (b) a stationary stopper element;
   (c) a tool holder magazine; and
   (d) transfer means for transferring tool holders between said tool holder magazine and said working spindle, said transfer means having a movable gripper for gripping said tool holders and having
   a hand with two jaws being each arranged pivotally about an axis and being each provided with two cams, respectively, for pivoting said jaws into a first operating position with said jaws closed for gripping one of said tool holders in a form-locking relationship or into a second operating position, respectively, with said jaws spread apart for introducing one of said tool holders between said jaws or for removing said tool holder therefrom, respectively,
   an axially displaceable, spring-loaded bolt being provided with four guiding surfaces extending at an angle relative to a longitudinal bolt axis, said guiding surfaces being distributed over a bolt periphery in oppositely directed pairs,
   four bolts being arranged one each between one of said guiding surfaces and one each of said cams to pivot said jaws between said first operating position with said spring released and said second operating position with said spring compressed by alternately urging a first and a second of said bolts against a first and a second of said cams on one each of said jaws by means of a first and a second of said guiding surfaces or urging a third and a fourth of said bolts against a third and a fourth of said cams on one each of said jaws by means of a third and a fourth of said guiding surfaces, and
   displacement means for displacing said movable gripper to bring said spring-loaded bolt into mechanical contact with said stationary stopper element thereby axially displacing said bolt.

2. The machine tool of claim 1, wherein said tool holder, said pivoting axes of said jaws and said bolt extended all in a parallel relationship.

3. The machine tool of claim 1, wherein adjustment means are provided for mechanically adjusting the position of said cams in a direction perpendicular to the axis of said bolt.

4. The machine tool of claim 1, wherein U-shaped stationary jaws are provided with a linear guide having a clear width corresponding to the diameter of said tool holders, said displaceable jaws being arranged upon said stationary jaws and having retaining means for said tool holders shaped as circular arcs, said retaining means being located outside said clear width when said displaceable jaws are in said second operating position.

* * * * *